United States Patent [19]
Devaux

[11] Patent Number: 5,594,583
[45] Date of Patent: Jan. 14, 1997

[54] APPARATUS FOR RE-SHAPING A TRAIN OF LIGHT PULSES, AND APPARATUS FOR RECOVERING A PERIODIC SIGNAL SYNCHRONIZED ON A TRAIN OF MODULATED LIGHT PULSES

[75] Inventor: Fabrice Devaux, Paris, France

[73] Assignee: France Telecom, Paris, France

[21] Appl. No.: 261,714

[22] Filed: Jun. 17, 1994

[30] Foreign Application Priority Data

Jun. 18, 1993 [FR] France .................. 93 07380

[51] Int. Cl.$^6$ .................. H04B 10/155; H04B 10/04
[52] U.S. Cl. .................. 359/184; 359/158; 359/176; 359/179
[58] Field of Search .................. 359/158, 161, 359/174, 176, 179, 184, 237–297

[56] References Cited

U.S. PATENT DOCUMENTS

| | | | |
|---|---|---|---|
| 4,768,848 | 9/1988 | Vaerewyck | 350/96.12 |
| 4,881,790 | 11/1989 | Mollenauer | 350/96.16 |
| 4,980,891 | 12/1990 | Izadpanah | 372/25 |
| 5,073,809 | 12/1991 | Bigan et al. | 357/30 |
| 5,239,400 | 8/1993 | Liu | 359/125 |
| 5,301,055 | 4/1994 | Bagchi et al. | 359/139 |
| 5,311,351 | 5/1994 | Chesnoy | 359/264 |
| 5,369,520 | 11/1994 | Avramopoulos et al. | 359/176 |

FOREIGN PATENT DOCUMENTS

| | | |
|---|---|---|
| WOA9209159 | 5/1992 | European Pat. Off. . |
| 62-189830 | 8/1987 | Japan . |
| 04245726 | 2/1992 | Japan . |

OTHER PUBLICATIONS

Noda, et al. "High Speed Electroabsorption Modulator with Strip–Loaded GaInAsP Planar Waveguide", IEEE/Journal of Lightwave Technology, vol. LT–4, No. 10, Oct. 1986, pp. 1445–1452 (*one reference).

E. Bigan, "*Modulateurs électro–absorbants en onde guidée pour liaisons optiques a 1,55 µm*," L'écho des Recherches No. 149, 3$^e$ Trimestre 1992, pp. 29–38.

F. Devaux, E. Bigan, A. Ougazzaden, B. Pierre, F. Huet, M. Carre and A. Carenco, "*InGaAsP/InGaAsP Multiple–Quantum–Well Modulator with Improved Saturation Intensity and Bandwidth Over 20 GHz*," IEEE Photonics Technology Letters, vol. 4, No. 7, Jul. 1992, pp. 720–723.

(List continued on next page.)

*Primary Examiner*—Leslie Pascal
*Attorney, Agent, or Firm*—Blakely, Sokoloff Taylor & Zafman

[57] ABSTRACT

Apparatus for reshaping a train of light pulses includes an electro-absorbent modulator to which the train of pulses is applied for the purpose of being resynchronized and reshaped. A periodic signal generator that is adjustable in phase and frequency applies a periodic signal to the modulator to voltage control said modulator. Servo-control means control said generator in phase and in frequency to minimize the mean photocurrent delivered by the modulator while it is both in its absorbent state and receiving a light pulse. The apparatus may also be used to recover a periodic signal that is synchronized on a train of modulated light pulses. The invention is applicable to long distance telecommunications by transmitting soliton pulses along optical fibers.

6 Claims, 2 Drawing Sheets

OTHER PUBLICATIONS

F. Devaux, "*Fabrication, characterisation and field trials of guided-wave, electroabsorption modulators at 1.55 μm for optical links at very high speed,*" Universite de Paris-Sud Centre D'Orsay.

J. P. Gordon and H. A. Haus, "*Random walk of coherently amplified solitions in optical fiber transmission,*" Optics Letters, vol. 11, No. 10, Oct. 1986, pp. 665–667.

K. Wakita, I. Kotaka, O. Mitomi, H. Asai, Y. Kawamura and M. Naganuma, "*High–Speed InGaAlAs/InAlAs Multiple Quantum Well Optical Modulators,*" Journal of Lightwave Technology, vol. 8, No. 7, Jul. 1990, pp. 1027–1031.

M. Suzuki, H. Tanaka, N. Edagawa and Y. Matsushima, "*New Applications of a Sinusoidally Driven InGaAsP Electroabsorption Modulator to In–Line Optical Gates with ASE Noise Reduction Effect,*" Journal of Lightwave Technology, vol. 10, No. 12, Dec. 1992, pp. 1912–1918.

M. Suzuki, H. Tanaka, K. Utaka, N. Edagawa and Y. Matsushima, "*Transform–Limited 14 ps Optical Pulse Generation with 15 GHz Repetition Rate by InGaAsp Electroabsorption Modulator,*" Electronics Letters, May 21, 1992, vol. 28, No. 11, pp. 1007–1008.

M. Nakazawa, K. Suzuki, E. Yamada, H. Kubota, Y. Kimura and M. Takaya, "*Experimental demonstration of soliton data transmission over unlimited distances with soliton control in time and frequency domains,*" NTT Telecommunication Fields Systems R&D Center Optical Transmission Line Laboratory, Tokai, Ibaraki–ken 319–11, Japan, pp. 33–36.

Journal of Lightwave Technology, vol. 10, No. 12, Dec. 1992, New York, US, pp. 1912–1918.

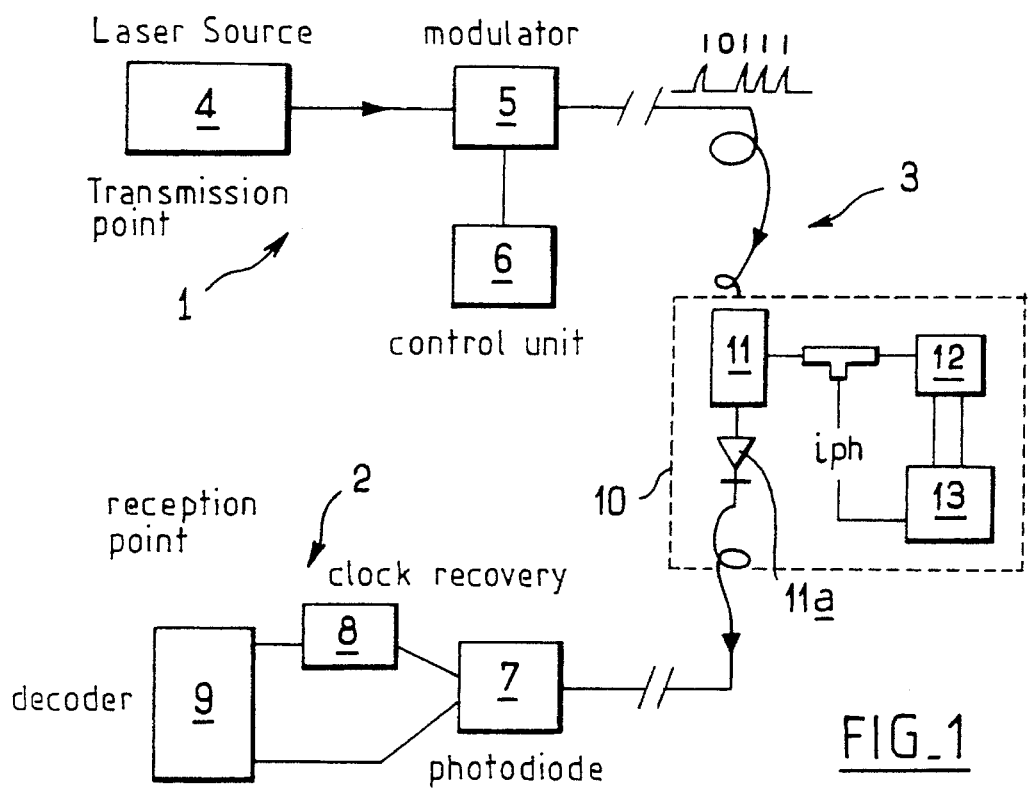
FIG_1
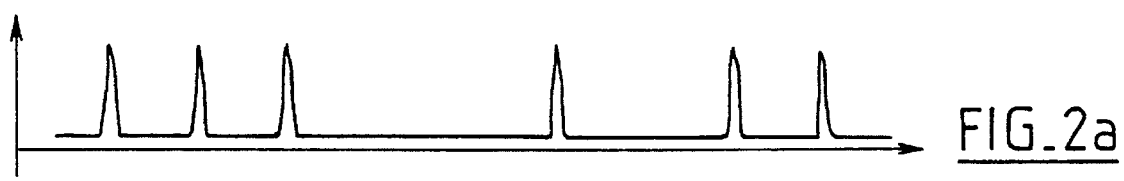
FIG_2a
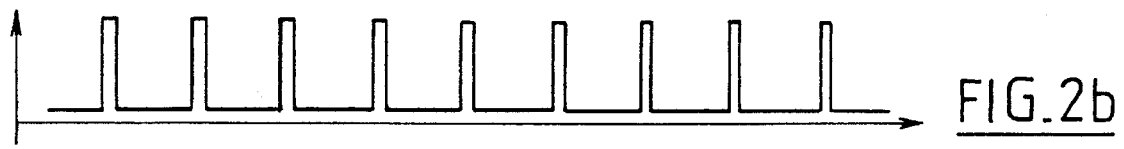
FIG_2b
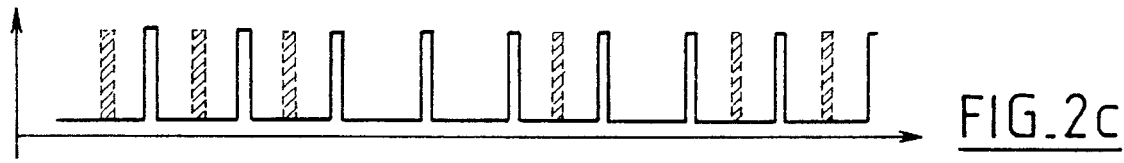
FIG_2c
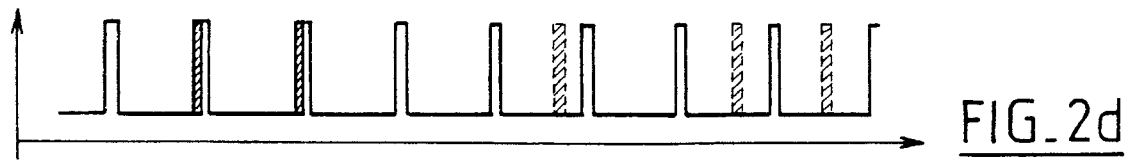
FIG_2d

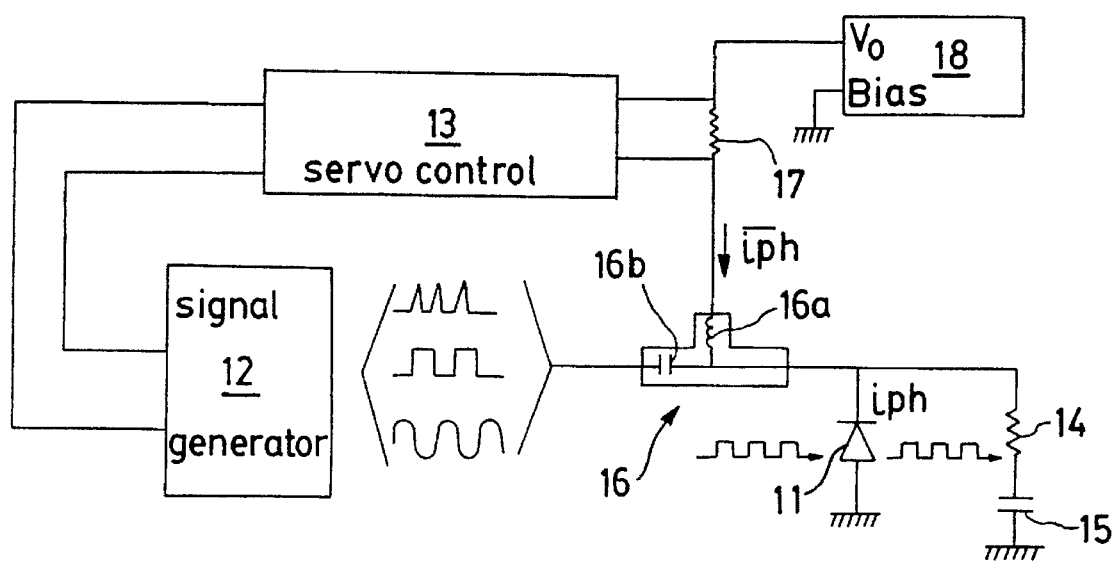
FIG_3

APPARATUS FOR RE-SHAPING A TRAIN OF LIGHT PULSES, AND APPARATUS FOR RECOVERING A PERIODIC SIGNAL SYNCHRONIZED ON A TRAIN OF MODULATED LIGHT PULSES

The present invention relates to the transmission of binary data via an optical path, in particular over long distances.

BACKGROUND OF THE INVENTION

More particularly, the invention relates to apparatuses for recovering periodic signals synchronized on trains of modulated light pulses, and also to repeater apparatuses for resynchronizing and re-shaping trains of modulated light pulses.

In long distance telecommunications (typically 10,000 km) the present trend is more and more towards transmission techniques using optical fibers enabling data to be transmitted reliably at high rates.

Whether modulated by means of soliton pulses or encoded using conventional RZ (return to zero) modulation, pulses are subject to deformation as they propagate along fibers.

In soliton transmission techniques, the Gordon-Haus effect gives rise to a time shift between successive soliton pulses (cf. J. P. Gordon-H. A. Haus "Random walk of coherently amplified solitons in optical fiber transmission", Optics Letters, Vol. 11, 665–667 (1986)). In conventional RZ modulation, the pulse shape is altered by dispersion.

Unfortunately, such deformation limits transmission both in rate and in distance.

To solve this problem, long distance telecommunications systems using optical fibers include in-line repeater apparatuses which resynchronize and reshape the pulses being transmitted. Such repeater apparatuses are uniformly distributed along an optical fiber circuit, e.g. once every 50 km.

In this respect, reference may advantageously be made to the article:

"Experimental demonstration of soliton data transmission over unlimited distances with soliton controls in the time and frequency domains", Nakazawa et al., NTT, Optical Fiber Communication 93 PD7, Optical Society of America.

In the repeater apparatuses described in that article in particular, a fraction of the transmitted signal is extracted and converted by means of a photodiode into an electrical signal. A clock signal is extracted from the electrical signal by conventional electronic clock-recovery means. The clock signal extracted in this way is used to control an electro-optical effect modulator to which the transmitted pulses are applied for the purpose of being resynchronized and reshaped.

It is recalled that an electro-optical modulator is an interferometer (Mach. Zender interferometer) which modulates the light it receives by making use of the variation in refractive index as a function of the electric field applied thereto as presented by certain materials. An example of a material of this type is lithium niobate ($LiNbO_3$) used for making electro-optical modulators that operate at 1.55 μm.

Nevertheless, such repeater apparatuses present several drawbacks.

Given that a fraction of the transmitted signal is extracted in line, light signal power losses are large, particularly since extracting the clock signal requires a light signal at high level in each repeater apparatus.

In addition, electronic circuits enabling the clock signal to be synchronized on the train of light pulses require the use of high speed components, and such components are not available at high soliton rates, in particular rates of the order of 40 Gbit/s which are presently envisaged for soliton transmission.

OBJECTS AND SUMMARY OF THE INVENTION

An object of the invention is to provide apparatus for recovering a signal synchronized on a train of modulated light pulses while enabling the light pulses to be conserved without being subjected to major attenuation.

Another object of the invention is to propose apparatus for synchronize signal recovery which can be implemented without using high speed electronic components or circuits other than those of the generator which emits the synchronized signal.

Such apparatus for synchronized signal recovery is advantageously used to implement repeater apparatus for resynchronizing and re-shaping a train of light pulses.

In the field of telecommunications by optical fiber, use is already made of electro-absorbent modulators which work on a different principle to electro-optical effect modulators. Electro-absorbent modulators are waveguides in which the core material presents absorption that is controllable as a function of the voltage applied thereto.

Proposals have thus recently been made to modulate the output of a laser source by means of an electro-absorbent modulator for the purpose of generating soliton pulses. In this respect, reference may advantageously be made to the following article:

"Transform-limited 14 ps optical pulse generation with 15 GHz repetition rate by InGaAsP electro-absorption modulator", M. Suzuki, Electronics Letters, May 21, 1992, Vol. 28, No. 11, pp. 1007–1008.

The present invention proposes using the photocurrent generated by such an electro-absorbent modulator while it is in its absorbent state and is receiving light flux, for the purpose of servo-controlling the generator of the periodic signals that are to be synchronized.

To this end, the invention provides an apparatus for reshaping a train of light pulses, the apparatus comprising:

a light modulator to which the train of pulses to be resynchronized and reshaped is applied;

a periodic signal generator that is adjustable in phase and in frequency which applies a periodic signal to the modulator, thereby providing voltage control for said modulator; and means for synchronizing the generator on the train of modulated light pulses received by the modulator;

wherein the modulator is a modulator of the electro-asborbent type; and wherein the means for synchronizing the generator include servo-control means controlling said generator in phase and in frequency, in such a manner as to minimize the mean photocurrent as generated by the modulator while it is in its absorbent state and receiving a light pulse.

The invention also provides a long distance optical fiber telecommunications system comprising:

generator means for generating trains of modulated light pulses;

detector and decoder means for detecting and decoding said pulses;

an optical fiber circuit for propagating pulses from the generator means to the detector and decoder means; and at least one repeater apparatus of the above type for in-line reshaping of the trains of light pulses.

The invention also provides an apparatus for recovering a periodic signal synchronized on a train of modulated light pulses, the apparatus comprising:

a periodic signal generator that is adjustable in phase and in frequency;

electro-optical means that receive the light pulses and that emit a corresponding electrical signal; and means for servo-controlling the phase and the frequency of the generator as a function of said electrical signal so as to cause the generator to deliver the synchronized signal;

wherein the electro-optical means include an electro-absorbent modulator which is voltage controlled by the synchronized periodic signal delivered by the generator; and wherein the servo-control means control the generator in such a manner that the mean photocurrent delivered by the modulator while in its absorbent state and receiving a light pulse is minimized.

BRIEF DESCRIPTION OF THE DRAWINGS

Other characteristics and advantages of the invention will appear further from the following description of various possible embodiments of the invention. The description should be read with reference to the accompanying drawings, in which:

FIG. 1 is a diagram of an optical fiber telecommunications system including re-shaping apparatus comprising one possible embodiment of the invention;

FIG. 2a shows a particular train of light pulses;

FIG. 2b shows a periodic signal synchronized on the FIG. 2a train of light pulses;

FIG. 2c shows a periodic signal phase-shifted relative to the FIG. 2a train of light pulses;

FIG. 2d shows a periodic signal frequency-shifted relative to the FIG. 2a train of light pulses; and FIG. 3 is a diagram of apparatus comprising another possible embodiment.

MORE DETAILED DESCRIPTION

The optical telecommunications system shown in FIG. 1 includes means 1 at a transmission point for generating trains of soliton pulses, and means 2 at a reception point for detecting and decoding these pulses. Between the transmission point and the reception point, the soliton pulses are conveyed by means of an optical fiber circuit 3.

In conventional manner, the pulse generator means 1 include a laser source 4 and a modulator 5 controlled by a control unit 6. By way of example, the laser source 4 emits light having a main wavelength of 1.55 μm, which wavelength corresponds to the attenuation minimum in the fibers of the optical circuit 3. The beam emitted in this way is applied to the modulator 5 which encodes it into soliton pulses that correspond to binary data received by the unit 6.

The modulator 5 may be a voltage-controlled electro-absorbent modulator, for example (cf. "Transform-limited 14 ps optical pulse generation with 15 GHz repetition rate by InGaAsP electroabsorption modulator", M. Suzuki, Electronics Letters, May 21, 1992, Vol. 28, No. 11, pp. 1007–1008).

The means 2 include a photodiode 7 that converts the optical signal it receives into a train of electrical pulses. This signal is applied firstly to a clock recovery circuit 8 and secondly to a processor unit 9 that uses the recovered clock signal to decode the transmitted signal.

A plurality of repeater apparatuses 10 are inserted in line in the optical fiber circuit 3 for resynchronizing and re-shaping the transmitted signals.

Such a reshaper apparatus 10 includes, more particularly, a voltage-controlled electro-absorbent modulator 11 under the control of a periodic signal generator 12. The electro-absorbent modulator 11 receives the train of light pulses conveyed by the fibers 3. An amplifier 11a is provided at the output of the modulator 11 to amplify the signals coming therefrom. The amplifier 11a is associated with an optical bandpass filter (not shown).

For further details concerning electro-absorbent modulator techniques, reference may advantageously be made to the following publications:

F. Devaux, "Fabrication, caractérisation et mise en oeuvre des modulateurs électroabsorbants en onde guidée à 1.55 μm pour des liaisons à très haut débit" [Manufacture, characterization, and implementation of 1.55 μm guided wave electro-absorbent modulators for very high rate links], thesis defended Mar. 26, 1993, University of Paris XI-Orsay;

E. Bigan, "Modulateurs électroabsorbants en onde guidée pour liaisons optiques à 1.55 μm" [Guided wave electro-absorbent modulators for optical links at 1.55 μm], L' Écho des Recherches, No. 149, 3rd quarter, 1992; and F. Devaux, E. Bigan, A. Ougazzaden, B. Pierre, F. Huet, M. Carré, and A. Carenco, "InGaAsP/InGaAsP multiple-quantum-well modulator with improved saturation intensity and bandwidth over 20 GHz", IEEE, pp. 1041–1135, 1992.

The generator 12 is controlled by a servo-control circuit 13 so that the periodic signal that it emits is synchronized on the train of light pulses.

The principle on which this servo-control is based is now described.

FIG. 2a shows an example of a train of light pulses received by the electro-absorbent modulator 11, and FIGS. 2b to 2d show various examples of periodic signals controlling the electro-absorbent modulator 11.

The train of light pulses shown in FIG. 2a corresponds to a train of 9 bits encoded as follows: 111001011.

Depending on the value of the voltage controlling it, the modulator 11 is either in an absorbent state, or else in a transparent state.

When it is in its absorbent state, the modulator 11 converts the optical signal it receives into a photo-current $i_{ph}$. When it is transparent, or when it is receiving no optical signal, the modulator does not emit any photocurrent. In FIGS. 2b to 2d, absorbed pulses are represented by shading.

The control voltage signal shown in FIG. 2b is exactly synchronized with the train of light pulses received by the modulator 11. The modulator is therefore never absorbent when it receives a pulse. The mean photocurrent $\overline{i_{ph}}$ that it emits is zero.

When, as shown diagrammatically in FIG. 2c, the control voltage signal is shifted relative to the train of light pulses, all of the pulses are received by the modulator while it is in its absorbent state. The mean photocurrent $\overline{i_{ph}}$ is therefore at a maximum, in particular: $\overline{i_{ph}} = 6/9$.

The control voltage signal shown in FIG. 2d is not at the same frequency as the train of light pulses received by the modulator. Some light pulses are received by the modulator 11 when it is in its absorbent state, while others coincide completely or partially with pulses in the control signal so that the modulator 11 is then in its transparent state. On average, the photocurrent $i_{ph}$ is non-zero (in particular: $\overline{i_{ph}}=3.76/9$).

Thus, the mean value of the photocurrent $\overline{i_{ph}}$ is at a minimum when the control signal is synchronized on the train of encoded light pulses.

According to the invention, the phase and the frequency of the control signal from the generator 12 is servo-controlled so as to minimize the mean photocurrent $\overline{i_{ph}}$ coming from the modulator 11.

A detailed example of the re-shaping apparatus is shown in FIG. 3.

In that figure, the modulator 11 is represented by a diode connected to ground potential and connected in parallel with a sub-circuit including a 50 ohm load resistor 14 connected in series with a decoupling capacitor 15. The terminal common to the load resistor 14 and to the modulator 11 is connected to a bias T forming a bandpass filter 16. The bias T is represented as having a branch of impedance 16a and a branch that forms a capacitor 16b.

The branch 16a is connected via a resistor 17 to a bias voltage source 18 that provides a bias voltage $V_0$. The servo-control circuit 13 which controls the frequency and the phase of the signal generator 12 is connected across the terminals of the resistor 17. The signal generator 12 applies high frequency periodic voltages to the branch 16b of the bias T.

The decoupling capacitor 15 and the capacitance of the branch 16 in the bias T apply the photocurrent $i_{ph}$ to the resistor 17.

The servo-control circuit 13 is a conventional phase locked loop (PLL) type circuit and it changes the phase and the frequency at which the signal generator 12 is controlled so that the voltage across the terminals of the resistor 17 is zero or below a certain preestablished threshold.

The voltage thus applied to the terminals of the electro-absorbent modulator 11 is the sum of the bias voltage provided by the supply 18 and the microwave frequency voltage from the periodic signal generator 12. Thus, as shown in FIG. 3, the signals emitted by the generator 12 may be of any desired waveform. The waveform is advantageously selected so as to enable the soliton pulses to be reshaped.

As it will have been observed, with such signal-shaping apparatus, it is not necessary to extract a fraction of the optical signal in order to obtain a periodic signal that is synchronized on the optical signal.

It will also be observed that the apparatus requires only a bandpass filter and no electronic circuits using high speed components other than the microwave frequency generator 12.

It will be understood that the above-described apparatus for reshaping pulses can be used more generally as apparatus for recovering a signal that is synchronized on a train of modulated light pulses. For example, such apparatus could be integrated in means for receiving light pulses for recovering a clock signal synchronized on the received pulse trains, before the pulses are applied to the detection photodiode.

I claim:

1. Apparatus for reshaping a train of light pulses, the apparatus comprising:

a light modulator to which the train of pulses to be resynchronized and reshaped is applied;

a periodic signal generator that is adjustable in phase and in frequency which applies a periodic signal to the modulator, thereby providing voltage control for said modulator; and means for synchronizing the generator on the train of modulated light pulses received by the modulator;

wherein the modulator is a modulator of the electro-absorbent type generating a photocurrent while it is in an absorbent state and is receiving a light pulse; and wherein the means for synchronizing the generator include servo-control means for controlling the phase and frequency of said generator, for minimizing the mean photocurrent as generated by the modulator while it is in its absorbent state and receiving a light pulse, thereby reshaping and resynchronizing the train of pulses.

2. Apparatus according to claim 1, wherein an amplifier is disposed at the output from the modulator.

3. Apparatus according to claim 1, wherein an optical bandpass filter is disposed at the output from the modulator.

4. A long distance optical fiber telecommunications system comprising:

generator means for generating trains of modulated light pulses;

detector and decoder means for detecting and decoding said pulses;

an optical fiber circuit for propagating pulses from the generator means to the detector and decoder means; and at least one repeater apparatus according to claim 1 for in-line reshaping of the trains of light pulses.

5. A telecommunications system according to claim 4, for transmitting data by means of soliton pulses, wherein the periodic signal generator of the repeater apparatus delivers periodic signals shaped for reshaping the light pulses into soliton pulses.

6. Apparatus for recovering a periodic signal synchronized on a train of modulated light pulses, the apparatus comprising:

a periodic signal generator that is adjustable in phase and in frequency;

electro-optical means that receive the light pulses and that emit a corresponding electrical signal; and means for servo-controlling the phase and the frequency of the generator as a function of said electrical signal so as to cause the generator to deliver the synchronized signal;

wherein the electro-optical means include an electro-absorbent modulator which is voltage controlled by the synchronized periodic signal delivered by the generator; and wherein the servo-control means control the generator in such a manner that the mean photocurrent delivered by the modulator while in its absorbent state and receiving a light pulse is minimized.

* * * * *